United States Patent [19]

Oddo

[11] 4,143,969

[45] Mar. 13, 1979

[54] SHEET GUIDE APPARATUS FOR DIAZO COPYING MACHINES

[75] Inventor: Eugene P. Oddo, Mt. Prospect, Ill.

[73] Assignee: Addressograph-Multigraph Corporation, Los Angeles, Calif.

[21] Appl. No.: 837,743

[22] Filed: Sep. 29, 1877

[51] Int. Cl.[2] .......................... G03B 27/30; G03D 5/06

[52] U.S. Cl. ...................................... 355/100; 354/318; 354/339

[58] Field of Search ............... 354/318, 319, 320, 321, 354/322, 338, 339; 355/27, 28, 100, 106, 64, 110

[56] References Cited

U.S. PATENT DOCUMENTS

| | | | |
|---|---|---|---|
| 1,900,878 | 3/1933 | Hopkins | 355/64 |
| 3,386,730 | 6/1968 | Hyosaka | 355/110 |
| 3,704,662 | 12/1972 | Johnson et al. | 354/318 |
| 3,707,328 | 12/1972 | Robertson | 355/106 |

FOREIGN PATENT DOCUMENTS

| | | | |
|---|---|---|---|
| 660347 | 3/1963 | Canada | 354/339 |
| 861541 | 2/1961 | United Kingdom | 355/110 |

*Primary Examiner*—L. T. Hix
*Assistant Examiner*—Alan Mathews
*Attorney, Agent, or Firm*—M. A. Kondzella; G. Jameson; R. S. Hulse

[57] ABSTRACT

A guide means is provided for guiding diazotype copy sheet material through a developing apparatus over and in contact with a pair of rotatable applicator rollers positioned in axially spaced apart parallel relation. Developer liquid is supplied to the surface of the rollers for developing the copy sheet. The guide means includes a first and a second set of fine, filament-like guide wires strung taut across the rollers in the direction of movement of the sheet material through the developing apparatus. The guide wires of each set are positioned in spaced apart parallel relation, and the wires of one set are offset axially from the wires of the other set. The guide wires prevent the sheet material from becoming wrapped about the applicator rollers during passage of the material through the developing apparatus.

4 Claims, 3 Drawing Figures

SHEET GUIDE APPARATUS FOR DIAZO COPYING MACHINES

BACKGROUND OF THE INVENTION

This invention relates generally to apparatus for developing diazotype copy material and, more particularly, to means for guiding the copy sheet material safely through the developing apparatus.

The method of developing diazo copy material by the application of relatively small, metered quantities of liquid developer is described in U.S. Pat. No. 3,446,620 and assigned to the same assignee.

Apparatus for carrying out the above method is disclosed in U.S. Pat. Nos. 3,626,833, 3,640,203 and 3,704,662, also assigned to the same assignee.

A further method and apparatus for pressure-diazo reproduction is disclosed in copending application Ser. No. 837,742, filed Sept. 29, 1977, assigned to the same assignee. As disclosed therein, there is provided a pressure-diazo developer apparatus comprising a pair of applicator rollers positioned in axially spaced and parallel relation rotatably mounted in an enclosure. The dual rollers enhance the copy quality and permit high volume reproduction. Thus, in a single roller machine as in the prior art, interstices appear in the developed copy sheet caused by the grinding pattern of the roller surface and the texture of the copy paper. However, with dual rollers the second roller is effective to fill-in the interstices missed by the first roller, thereby producing a diazo copy of a quality considerably higher than that which can be produced with a single roller developer apparatus.

In direct contact copy machines, wherein a superimposed copy sheet and original tracing are exposed and subsequently separated, and the copy sheet is transported through a developing apparatus whereat a liquid developer is applied to the copy sheet as the latter is carried over one or more rotatable applicator rollers, there exists the possibility that the copy sheet, rather than merely passing over the rollers, will adhere to the wetted roller surface and become wrapped thereabout. If this occurs, the copy sheet could be damaged and it becomes a difficult and time consuming matter to easily release the wrapped copy sheet from the roller.

The principal advantage of the pressure-diazo apparatus disclosed in the above application is that the dual roller arrangement enables high volume reproduction and copies of a quality comparable to those of an ammonia diazo process. However, the apparatus does not provide for the prevention of copy sheet jamming during passage of the sheet through the developing apparatus. The present invention provides copy sheet guide means for use with, for example, a machine as described in the above application which prevents the copy sheets from adhering to the wetted rollers and causing a sheet jam.

SUMMARY OF THE INVENTION

The present invention provides a sheet guide means for use with a dual roller pressure-diazo machine comprising a plurality of guide wires strung transversely to and in contact with the applicator rollers to prevent sheet jams as a result of a copy sheet becoming wrapped about the rollers. Although a similar arrangement is shown in U.S. Pat. No. 3,707,328, assigned to the same assignee, it has been found that the use of such guide wires with a single roller developer apparatus results in the wires streaking or marking the copy sheets during development.

In the present invention, because of the two roller arrangement, and with the guide wires positioned in grooves so as to be below the surfaces of the rollers and in offset spaced apart relation from one to the other roller, marking or streaking of the copy sheet by the guide wires is eliminated because any undeveloped streaks caused by the wires associated with the first roller will be developed by the second roller.

It is an object of the present invention to provide an improved guide means, for use with a pressure-diazo developer apparatus utilizing a dual applicator roller arrangement, to prevent copy sheet jamming while obviating any marking of the copy sheet by the guide means during development of the sheet.

A feature of the invention is to provide a copy sheet guide means which is simple in construction, economical to manufacture and reliable in operation.

Other objects, features and advantages of the invention will appear hereinafter as the description proceeds.

IN THE DRAWING

DESCRIPTION OF THE PREFERRED EMBODIMENT

Figure 1:
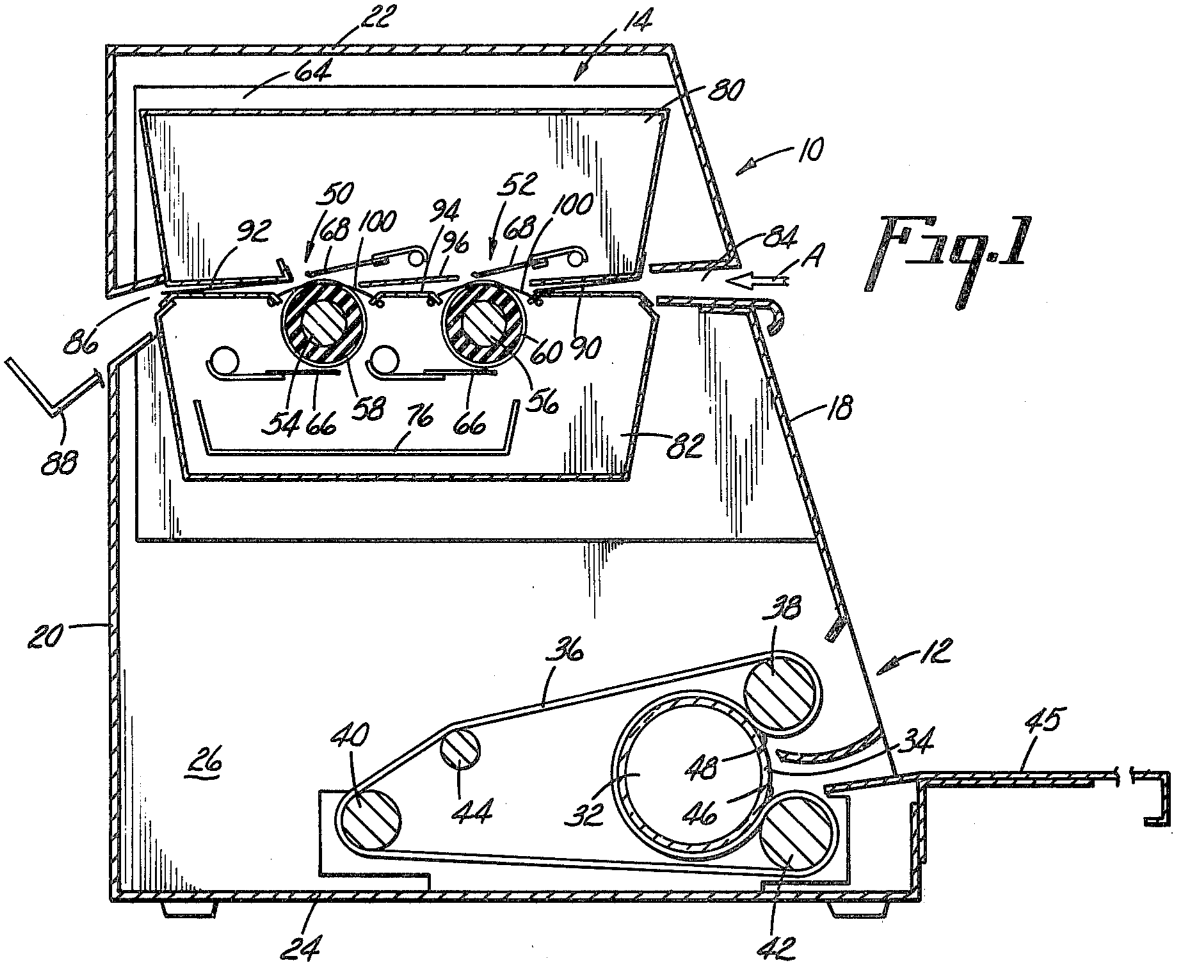
FIG. 1 is an end sectional view of a diazotype copying machine incorporating a dual roller developing apparatus.
Figure 2:
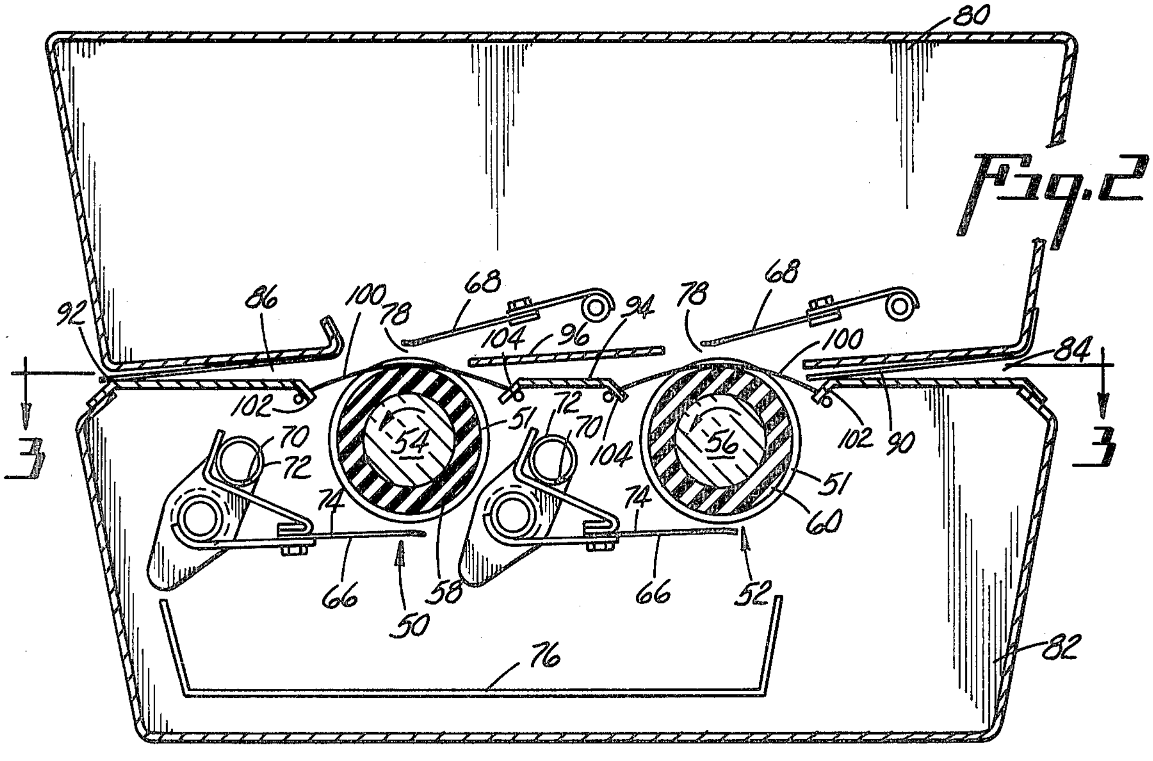
FIG. 2 is an end sectional view in detail of the developing apparatus of FIG. 1, on an enlarged scale, incorporating a guide means according to the invention.

With reference to FIGS. 1 and 2, there is shown a diazotype copying machine indicated generally by the reference numeral 10, of the type shown and described in the aforementioned patent application, embodying the features of the present invention. The machine includes an exposure apparatus and a developing apparatus indicated generally by the reference numerals 12 and 14 respectively. The copying machine also comprises a housing including a front wall 18, a rear wall 20, an upper wall 22, a bottom wall 24, and side walls, only one shown at 26 in FIG. 1, interconnecting the front, rear, upper and bottom walls.

The lower section of the housing includes the copy sheet exposure apparatus 12 for exposing a diazo sensitized copy sheet to light while the copy sheet is in surface-to-surface contact with an original tracing, for the purpose of imaging the copy sheet. The particular copy sheet exposure apparatus shown may be of the kind disclosed in the above U.S. Pat. No. 3,704,662, for example, and comprises a rotatable lamp 32 about an outer surface 34 of which is carried a sandwiched copy sheet and original tracing (not shown) for exposure of the former. An endless belt 36 is also mounted for movement along rollers 38, 40 and 42. A smaller roller 44 provides tension to the belt 36 to ensure that the latter is in close contact with the lamp 32.

The sandwiched original tracing and copy sheet are fed over a shelf 45 into an entrance 46 adjacent the roller 42 and between the belt 36 and the outer surface 34 of the lamp 32. The original and copy sheet are carried about the lamp 32 and depart at an exit 48 adjacent the roller 38. At this point the copy sheet has been exposed. The copy sheet is separated from the original tracing and is now ready for development in the developing apparatus 14 in the upper section of the housing.

The developing apparatus comprises a pair of applicator rollers 50 and 52 having central metal shaft portions 54 and 56, respectively, and outer or peripheral layers 58 and 60, respectively, of a smooth non-porous resilient material such as rubber. Each of the outer layers 58 and 60 is specially prepared to form a developer fluid carrier surface having irregular micro-recesses of varying depths and sizes. The rollers 50 and 52 in addition to applying developer liquid to a copy sheet also transport the copy sheet through the developing apparatus 14. For a more detailed description of the roller surface and its preparation, the reader's attention is directed to U.S. Pat. Nos. 3,626,833 and 3,640,203, assigned to the same assignee.

The rollers 50 and 52 are mounted for rotation between vertically extending side walls, only one side wall 64 being shown in FIG. 1, and are driven by suitable drive means not shown in the drawing. As shown in FIG. 2, positioned on opposite sides of each of the applicator rollers 50 and 52, spaced 180° from each other thereabout, is a pair of blade members 66 and 68. Developer liquid is dispensed through an aperture 70 in a conduit 72 onto a surface 74 of the blade 66 and, upon the latter making engagement with the surface of the roller, is applied onto the roller surface.

Metering blade members 66, together with the roller surfaces, deliver a controlled amount of developer fluid to a copy sheet being developed as the sheet is transported through the developing apparatus 14 by the rollers 50 and 52. The blade members 66 wipe away excess developer fluid which in turn drains into a trough 76 mounted beneath the applicator rollers and the metering blades.

The second blade member 68, when engaged with the roller surface, applies to the latter surface pressure along a line of contact therewith equal to the force applied by the blade member 66, 180° about the roller. The contact area forms a developing zone 78 (FIG. 2) through which copy sheets are passed to be developed.

The physical movement of the blade members is controlled by a control-linkage and electrical contact assembly as fully shown and described in the aforementioned U.S. Pat. No. 3,704,662.

With reference to FIGS. 1 and 2, it will be seen that the developing apparatus 14 provides a substantially enclosed housing comprising an upper chamber 80 and a lower chamber 82 mounted between the side walls. The chambers are arranged so as to provide a copy sheet ingress 84 and an egress 86 from which the developed copy sheet may be discharged from the developer apparatus to a hopper 88.

To further maintain the chambers 80 and 82 substantially enclosed, the ingress 84 is provided with a flexible seal 90 and the egress 86 is provided with a similar seal 92, to thereby maintain the ingress and egress passages closed during development of a copy sheet, while permitting the copy sheet to pass therethrough in response to displacing or lifting the seals by the copy sheet entering and exiting into and out of the developing apparatus.

Positioned between the applicator rollers 50 and 52 is a shelf 94 for supporting a copy sheet passing through the developing unit. A guide plate 96 for guiding a copy sheet in its travel through the developer apparatus is positioned above the shelf 94.

In prior art devices, on some occasions during the developing of the copy sheets passing through the developing apparatus 14, a copy sheet will adhere to the applicator roller. When this occurs the copy sheet becomes wrapped about the roller and continues to rotate thereabout indefinitely. This wrapping of the copy sheet about the roller could damage the copy sheet, and make it impossible to process subsequent copies through the developer apparatus until the sheet is removed. Furthermore, it is difficult and time-consuming to free the wrapped copy sheet from the roller.

Figure 3:
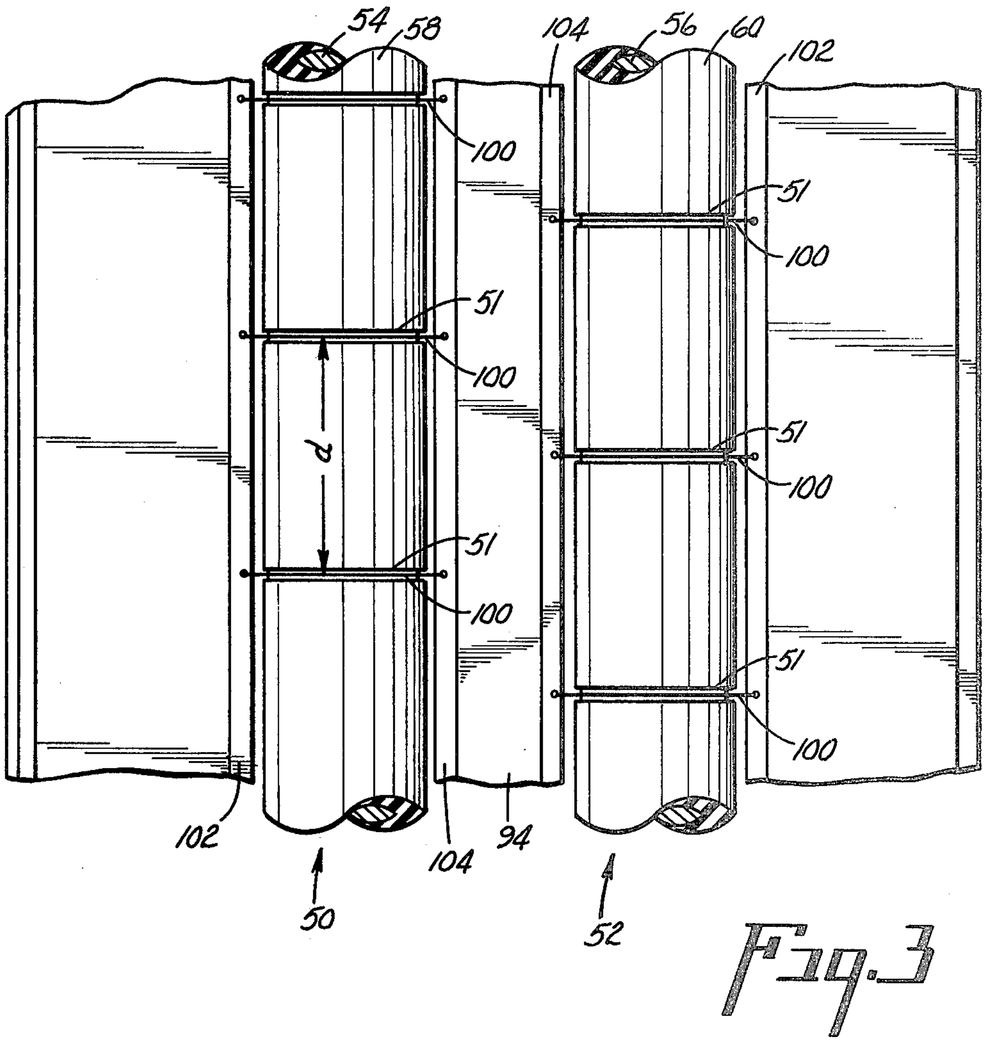
FIG. 3 is a partial plan view of the guide means as viewed on the line 3—3 of FIG. 2.

To prevent the foregoing sheet jam from occurring in the present invention, there is provided in the developing apparatus 14 a guide means comprising a first and a second set of guide wires, each set including a plurality of wires 100 positioned in spaced apart parallel relation. The roller 50 is provided with a plurality of annular grooves 51 as shown in FIG. 3, positioned in corresponding relation to the guide wires such that each groove supports therein a portion of a respective guide wire of the set. The guide wires are strung taut by securing one end thereof to a lip 102 of the lower chamber 82 and the other end to a lip 104 of the shelf 94. The second set of guide wires is similarly arranged in association with the roller 52.

The guide means includes a plurality of extremely fine, filament-like wires 100, each having a diameter less than 0.004 inches and preferably about 0.002 inches. The first set of wires is strung taut across and in the grooves 51 of the applicator roller 50 in the direction of movement of the copy sheet as indicated by the arrow A in FIG. 1. As shown in FIG. 3, the wires are spaced from each other at a distance "d" of approximately two inches along the length of the applicator roller to accommodate varying widths of copy sheets passing through the developing unit. The second set of wires 100 associated with the applicator roller 52 are arranged in the same manner but are offset from the wires 100 associated with the applicator roller 50. In this way, any undeveloped streaks on the copy sheet caused by the wires associated with the applicator roller 52 will be developed by the applicator roller 50 because of the offset arrangement of the guide wires.

It is to be understood that the use of the term "wire" as used herein is not restricted to a metallic member, but refers to other materials as well, such as, for example, synthetic or organic fibers, rubber and the like, which are suitable for use in the environment of a developer unit of the type described. A preferred "wire" material is, however, a nylon or stainless steel strand. Because the wires are positioned in the grooves 51, they lie below the peripheral surface of the rollers and are not subject to frictional forces applied thereagainst by the action of the pressure blades 68 acting against the surface of the applicator rollers. The guide wires 100 positively prevent a copy sheet from wrapping about the wetted applicator rollers, guide the sheet across the applicator rollers and do not interfere with the development of the copy sheet.

The guide means is a positive but simple means to prevent copy sheets from becoming wrapped about the liquid applicator rollers in a copy machine of the type disclosed. The guide means is effective to prevent copy sheet jams and needs little, if any, maintenance. In the event a wire of the guide means should require replacement, it is a simple matter to release the wire from its mountings and fix a new wire in its place.

From the foregoing, it will be appreciated that the present invention provides a novel guide wire means, for use with a dual roller diazo machine, effective to prevent copy sheet jams resulting from a copy sheet wrapping around the rollers while preventing any streaking of the copy sheet being developed. Thus, because of the offset arrangement of the guide wires from one applicator roller to the other in the direction of sheet travel, and because that portion of each wire contacting the applicator roller is retained in a groove so as to position the wire below the surface of the roller, if for any reason a portion of the copy sheet should not be completely developed as it passes the first applicator roller, that undeveloped portion will be developed by the second applicator roller having the guide wires positioned offset relative to the guide wires of the first roller.

What is claimed is:

1. In an apparatus for developing a diazotype copy sheet including a developer unit having a supply of developer liquid, a chamber having an ingress and an egress for passage of a copy sheet through the chamber for development, a first and a second roller rotatably mounted in the chamber in tandem axially spaced apart parallel relation, each said roller having a surface adapted to carry a quantity of developer liquid, means for applying a metered amount of developer liquid from the supply to the surface of each said first and second rollers, and drive means for rotating the first and second rollers, the improvement comprising:

guide means comprising a first and a second set of guide wires to prevent wrapping of the copy sheet about the rollers as the copy sheet is transported sequentially over and in contact with an upper peripheral surface of each of the first and second rollers, said first set of guide wires being strung taut above and transverse to the first roller in spaced apart parallel relation with a portion of each said guide wire of the first set of guide wires extending over and in contact with the first roller with said portion disposed below the upper peripheral surface thereof, and said second set of guide wires being strung taut above and transverse to the second roller in spaced apart parallel relation and offset axially from the first set of guide wires with a portion of each said guide wire of the second set of guide wires extending over and in contact with the second roller with said portion disposed below the upper peripheral surface thereof.

2. An apparatus as set forth in claim 1 in which the first and the second roller are provided with a plurality of annular peripheral grooves for supporting therein said portion of each of the first and the second set of guide wires.

3. An apparatus as set forth in claim 1 in which the guide means comprises a plurality of guide wires each having a diameter of less than 0.004 inches.

4. In a copying machine for making a copy of an original document on a copy sheet, including an exposure station whereat a superimposed original and copy sheet are illuminated to create an image of the former on the latter, a developing station including a developer unit having a supply of developer liquid, a chamber comprising an ingress and an egress for passage of the copy sheet through the chamber for development, first and second rollers rotatably mounted in the chamber in tandem axially spaced apart parallel relation, each said roller having a surface adapted to carry a quantity of developer liquid, means for metering a predetermined amount of developer liquid from the supply to the surface of each said first and second rollers, and drive means for rotating the first and second rollers, the improvement comprising:

guide means comprising a first and second set of guide wires strung taut between the ingress and the egress of the chamber above and transverse to the rollers, said first set of guide wires positioned in spaced apart parallel relation along the first roller over the length thereof with a portion of each said guide wire of the first set of guide wires extending over and in contact with the first roller with said portion disposed below an upper peripheral surface thereof, and said second set of guide wires positioned in spaced apart parallel relation along the second roller over the length thereof and offset axially from the first set of guide wires with a portion of each said guide wire of the second set of guide wires extending over and in contact with the second roller with said portion disposed below an upper peripheral surface thereof;

whereby the guide means guides the copy sheet safely over and in contact with the upper peripheral surface of each of the rollers while preventing the wrapping of the copy sheet about the rollers.

* * * * *